United States Patent [19]

Pugsley

[11] Patent Number: 4,496,968
[45] Date of Patent: Jan. 29, 1985

[54] REPRODUCTION OF COLORED IMAGES

[75] Inventor: Peter C. Pugsley, Pinner, England

[73] Assignee: Crosfield Electronics Limited, London, England

[21] Appl. No.: 397,701

[22] Filed: Jul. 13, 1982

[30] Foreign Application Priority Data

Jul. 14, 1981 [GB] United Kingdom ................. 8121659

[51] Int. Cl.³ ........................... G03F 3/08; H04N 1/46
[52] U.S. Cl. ......................................... 358/80; 358/75
[58] Field of Search ......................... 358/80, 81, 82, 75

[56] References Cited

U.S. PATENT DOCUMENTS 4,149,185  4/1979  Weinger ................................ 358/80
4,402,007  8/1983  Yamada ................................ 358/80

Primary Examiner—John C. Martin
Assistant Examiner—Victor R. Kostak
Attorney, Agent, or Firm—Sughrue, Mion, Zinn, Macpeak, and Seas

[57] ABSTRACT

In colored image reproduction, we have found that for the appearance of some self-colored objects (e.g. human flesh or plant leaves) to be satisfactory, when picture elements of the object are expressed in terms of luminance (L) and two chromaticity signals (CHR1 and CHR2), each chromaticity signal is a single-valued function of the luminance. In this specification, such objects are identified by means of a mask (24) or by a color recognition circuit or both and the corresponding area of the reproduction is made under the control of the luminance signal (L) for the picture elements of the object and two chromaticity signals generated by digital look-up tables (LUT2 and LUT3) having the luminance signal as an input and loaded with functions representing the respective functions relating chromaticity to luminance for that object.

15 Claims, 5 Drawing Figures

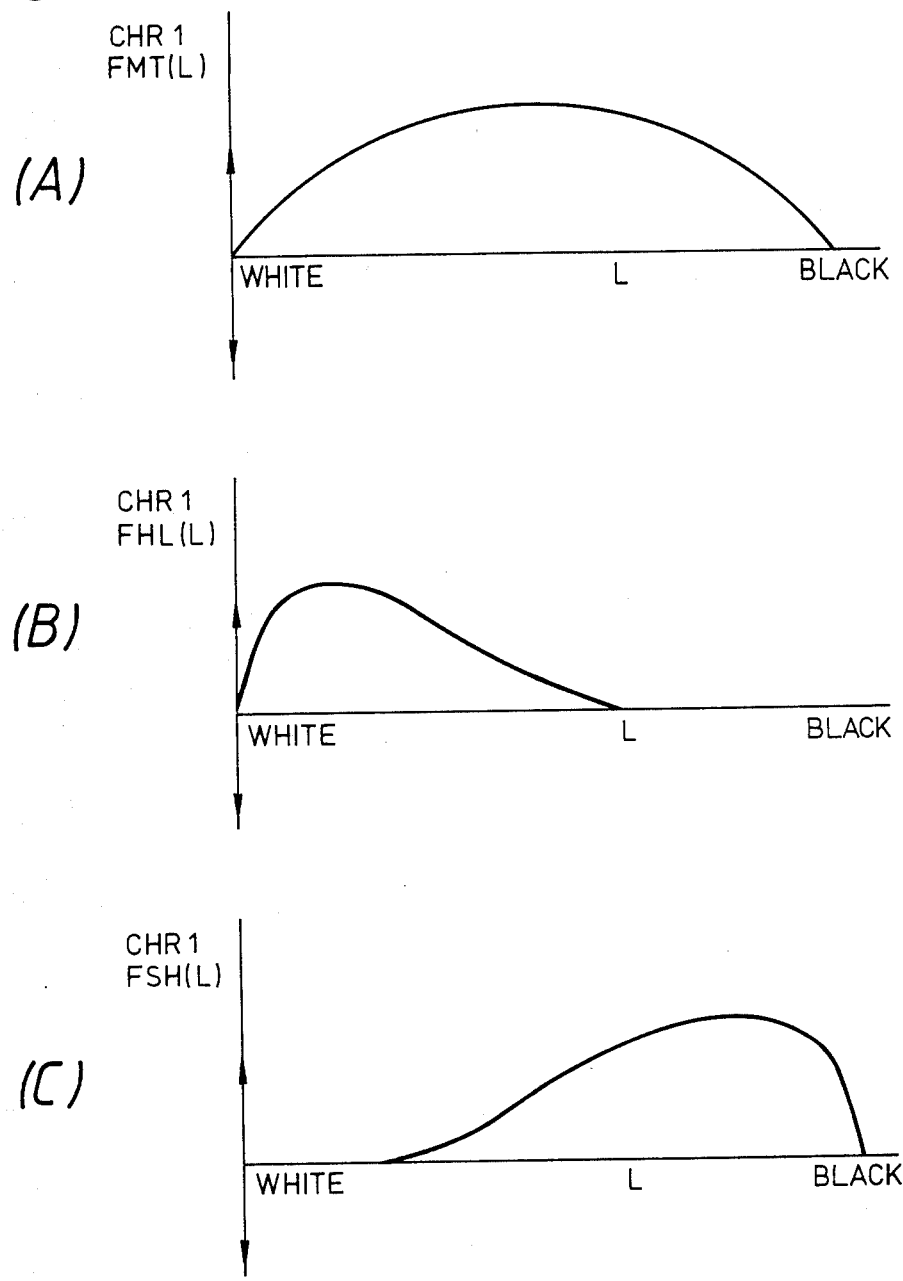

REPRODUCTION OF COLORED IMAGES

This invention is concerned with methods and apparatus for reproducing colour pictures and is concerned with the generation of colour-representing signals to enable a particular hue in an image to be created or modified.

The invention may be incorporated in a video retouching system (VRS) which uses colour-component signals which have been stored following the scanning of a coloured original image to derive the signals. For a retouching operation, i.e. modifying the image prior to using the data to prepare printing plates, the data is displayed as an image on a colour monitor tube in such a system. The image is modified by an operator using the functions available to him and the changes are recorded. When a satisfactory image has been obtained on the tube, the recorded changes are applied to the stored data and the modified stored data is subsequently used to provide the picture reproduction.

According to the present invention, a method of image reproduction of the kind in which electric signals representing colour values of successive picture elements of an original are derived and, after modification, are used to control the colours of corresponding picture elements in the reproduction, comprises: deriving a luminance signal from the colour-representing electric signals; applying the luminance signal as an input to each of a pair of one-dimensional function generators to generate chromaticity signals as predetermined or adjustable functions of the luminance signal; and using the generated chromaticity signals and the luminance signal in place of the colour-representing electric signals in making the reproduction.

Preferably, the image is displayed on a display unit and the function generators are varied by an operator until the displayed image is satisfactory. Preferably each function generator comprises a one-dimensional look-up table and preferably the luminance signal is applied to an earlier gradation-controlling look-up table, the output of which is taken to the inputs of the look-up tables for generating chromaticity signals.

In a colour reproduction some objects appear to be of varying shades of a single general colour, the variation giving the effect of "modelling". The colour reproduction for such object may be quite critical. The invention is based on the fact that it is found that in many cases the colours of different points on such objects lie on a single locus in three-dimensional colour space such that each chromaticity component is a fixed function of the luminance component. In other words, if the three colour-component signals derived from a conventional scanning operation (red, green and blue) are converted to a luminance component l and two chromaticity components h and j, when the colour reproduction of such objects is satisfactory h approximates to a single-valued function of l, and j also approximates to a different single-valued function of l. A good example of this can be seen in the reproduction of flesh tones. The eye is very critical of flesh tone reproduction and it is therefore important to ensure that no aberrant flesh tones remain in the final print.

The functions of the luminance signal which are used to derive the chromaticity signals can be standardised functions but in our preferred method there is provision for the operator to modify these functions if he thinks it desirable.

It will be seen that the use of the invention is advantageous in that for flesh tones, plant leaves and other self-coloured objects it allows changes in hue in a manner closely simulating the relation between hue, saturation and luminance. Moreover, it is possible to achieve the colour replacement using two one-dimensional look-up tables (LUT's) to derive the chromaticity signals from the luminance signal. One-dimensional look-up tables can easily be interactively controlled by a computer. This is not feasible with two- or three-dimensional tables. The extra gradation-controlling look-up table referred to above is desirable but not essential.

In order that the invention may be better understood, an example of apparatus embodying the invention will now be described with reference to the accompanying drawings, in which:

FIGS. 3A, 3B, and 3C are graphs showing how the three tables seen in FIG. 2 might be loaded.

Figure 1:
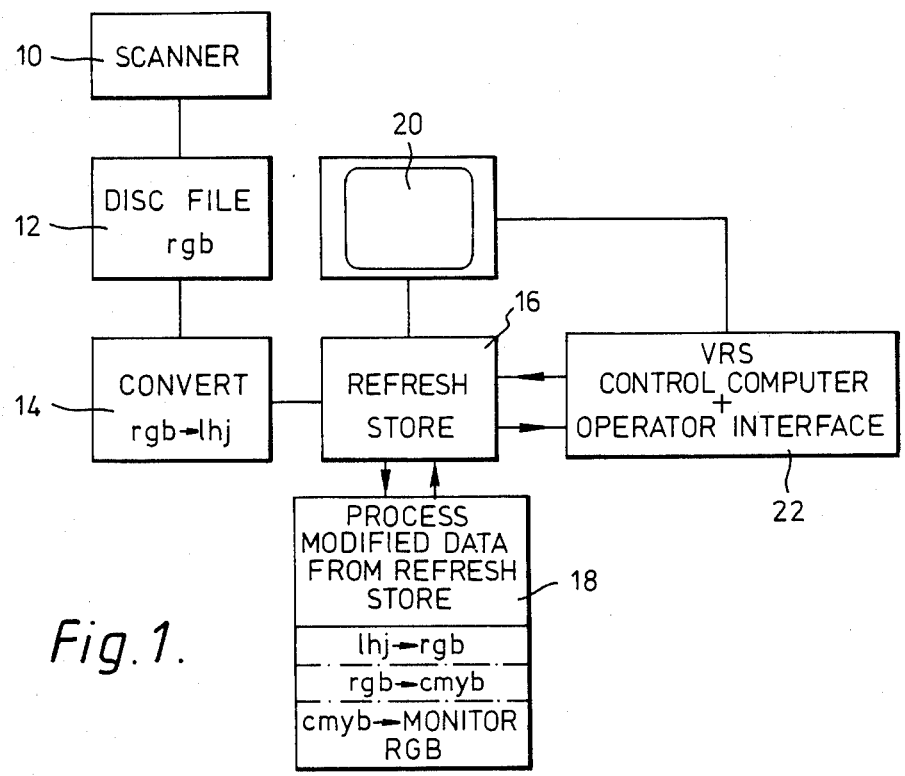
FIG. 1 is a block diagram of the video retouching system as a whole.

In FIG. 1, images of coloured originals are scanned on a scanner 10 and the resulting colour-component signals (r, g and b) are stored on a disc file 12. The signals r, g and b are the digital tonal values of red, green and blue components of the colour of successive points scanned on the image. The details of the scanner and the disc file form no part of this invention and it is emphasized that that part of the circuit which carries out the method according to the invention derives its input signals from stored data.

In FIG. 1, data from the disc file 12 is passed to a converter 14 which converts the r, g and b values into l, h and j values, where l is luminance and h and j are two chromaticity signals. The precise choice of chromaticity axes for h and j is irrelevant to present purposes; it is possible to take red for positive values of one chromaticity signal (green being its negative) in conjunction with blue for positive values of the other chromaticity signal (yellow being its negative).

For retouching purposes, the l, h and j signals are fed to a refresh store 16 which has two-way communication with a data-processing block 18 which provides, from the l, h and j signals, other signals suitable for operating the colour monitor display tube 20, to which the refresh store 16 is also connected. The conversion of the l, h and j signals into display signals should be such as to restrict the display to printable colours. Block 18 also provides the cyan, yellow, magenta and black signals which (when the displayed image is satisfactory) are used to form the colour separations for colour printing.

Store 16 also has a two-way communication with a video retouching control computer and operator interface, shown as block 22. That part of block 22 which is relevant to the present invention is shown in greater detail in FIG. 2.

Before describing FIG. 2, reference will be made to the manner in which the operator carries out the colour-replacement function in accordance with the invention, in the embodiment shown in the drawings. After viewing the colour monitor display 20, the operator uses a cursor to define a mask by outlining and filling a portion of the image whose colour is required to be replaced. This mask is stored, in known manner, in the form of signals representing as many coordinate values as are required to define the mask. By "filling", we mean for example that all picture elements within the electronically defined outline are associated with a stored "zero" while all picture elements outside the outline are associated with a stored "one". When the screen of the monitor 20 is scanned to display the image, a computer compares the stored masked area with the position of the monitor scanning spot and operates a mask switch when the mask area is entered.

Figure 2:
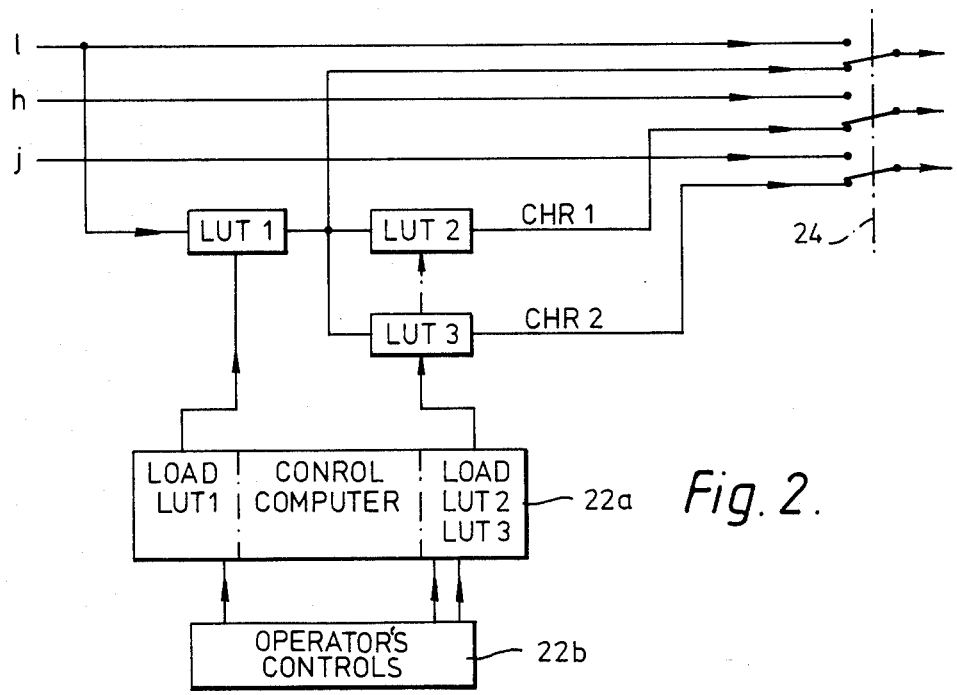
FIG. 2 is a block diagram of a part of the control computer and operator interface block shown in FIG. 1.

Referring now to FIG. 2, the l, h and j signals at the top left-hand corner are seen as arriving from the refresh store of FIG. 1. When the computer detects that the scanning spot of monitor 20 is moving into the mask area, it operates an electronic switching means shown diagramatically in FIG. 2 as a mask switch 24; the effect is to place the switches in their lower positions.

A luminance signal 1 passes to an interactive look-up table LUT1, by means of which the operator adjusts gradation. By "interactive" we mean that the loading of the table can be modified by an operator in real time. The output of LUT1 is applied to the luminance output of the mask switch 24; it is also applied directly to the inputs of further one-dimensional look-up tables LUT2 and LUT3. LUT2 is loaded with a fixed function representing the known fixed function relating h to l for flesh tones (in this example); similarly, LUT3 is loaded with the known fixed function relating j to l for flesh tones.

The outputs of LUT2 and LUT3 pass respectively to the chromaticity outputs of mask switch 24.

There are, in effect two display stages in the invention. First the operator modifies LUT1 to adjust the gradation of the luminance signal of the image portion within the mask. In other words, the operator normalises the lightness of the flesh tone. This provides the luminance output and it also provides luminance inputs for the two chromaticity look-up tables.

The manner in which the second display stage is carried out will now be described. Three standard curve shapes are stored in the control computer 22a and these will be referred to as FHL (highlight function) FMT (midtone function) and FSH (shadow function). The stored midtone function is essential and is derived by a procedure which will now be described. The highlight and shadow functions are optional improvements and the curve shapes are not so critical.

The standard curve shape for the midtone function mimics the average variation of saturation found on reproductions in typical transparencies of real objects. For example, for a single self-coloured object (for example a human arm or the leaf of a plant) appearing in a colour transparency, a set of measurements is made, consisting of measurements at various points of the object of the object, the points varying from the lightest and most brightly lit areas to the darkest areas of the object. These measurements are made in or converted into colour and luminance coordinates chosen for operation of the system. Any convenient system of three coordinates may be used, provided that one of these is a measure of luminance of approximates thereto.

This may be repeated for a number of objects, each giving rise to a corresponding set of measurements. For each set of measurements, the chromaticity readings CRH1 and CRH2 are plotted against the value of luminance. It is found from experience that for the majority of pictures of natural self-coloured objects, the resulting plot for a single object approximates to a single-valued curve for CHR1 and a single-valued curve for CHR2.

It will be assumed that the look-up table LUT1 has already been loaded with the required gradation characteristic.

To load the look-up table LUT2, the table is first "initialised" with the value CHR1-NEUT, representing the value of that chromaticity coordinate corresponding to neutral. Table LUT 3 is similarly loaded with the value CHR2-NEUT. As a consequence, the picture displayed will initially appear monochrome and neutral.

The operator may now adjust his controls 22b introduce colour into the display. The computer scans the operator's controls to determine whether any adjustment has been made, requring an alteration of the loading of the look-up table. This process will not be described in detail, since it is not a part of the present invention and the programming of such a function is well known.

When a change in adjustment is detected, a "reload" sub-routine is put into operation; this involves entering into the table for each luminance value a new value which can be expressed in "basic" language as the sum of the original value CHR1-NEUT, and values CHR1HL* FHL(L), CHR1MT* FMT(L) and CHRSH* FSH(L), these being values derived from the settings of the operator's highlight, midtone and shadow controls for CHR1. These values can be positive or negative. A similar reloading operation is carried out for the look-up table LUT3. In general, of course, the operator's control settings for LUT3 will be different from those for LUT2.

Operation of the main controls CHR1MT and CHR2MT will result in the picture becoming coloured, the hue and saturation in the main part of the tonal range depending upon the settings of the controls. The settings of the supplementary controls for highlight and shadow of the two chromaticity coordinates (and of any further supplementary controls which may be provided), enable a closer control of colour variation in the different parts of the tonal range. For example, if it is desired that the shadows on a particular object should appear to have more blue than the main part of the object, a suitable adjustment of controls CHR1SH and CHR2SH in the blue direction will produce the desired effect.

The l, h and j signals are then converted into c, m, y and b and thence to R, G, B, signals and are displayed again.

The changes to the display data are recorded in a command file (not shown) in the control computer. When the observed replacement colour is satisfactory, the recorded commands are applied to the data in the processing block 18 as modifications to the l, h and j signals. These signals are then reconverted into r, g and b form and the modified data is sent back to the disc file 12.

We have already referred to the generation of the mask signal, using a cursor to outline the area of the object to be altered.

When the colour of the object to be altered occupies a volume in colour space distinct from the colour of other parts of the picture, another method is possible, namely the provision of a colour recognition circuit arranged to receive the incoming signals and to control the bypass switch appropriately. In a further possibility, the two methods can be used together, the use of the cursor defining the area within which replacement of chromaticity signals may occur, and a colour recognition circuit selecting for modification only signals of a given hue within the selected area. Thus, the mask switch is made to operate only when the scanner is operating within the area defined by the cursor and at the same time the incoming colour signals represent the given hue.

By arranging the luminance modification table LUT1 in the luminance path before the luminance signals are derived for LUT2 and LUT3, it is ensured that the relation between output luminance and generated chromaticity signals is not disturbed by operation of the luminance look-up table.

FIG. 3 illustrates typical stored curve shapes for the mid-tone, highlight and shadow characteristics for one of the chromaticity coordinates (CHR1), plotted against luminance (L). For white and black values of luminance, the chromaticity values are neutral and in the example shown each curve extends on one side only of the luminance axis. This is normal for flesh tones but need not be so for other self-coloured objects.

The mid-tone, highlight and shadow characteristics for CHR2 will be generally similar to those for CHR1, though not the same.

A better idea of the meaning of the curves may be obtained if the two chromaticity axes CHR1 and CHR2 (e.g. red-green and yellow-blue) are considered to lie in a plane with the luminance axis extending perpendicularly from the the junction of the CHR1 and CHR2 axes. As luminance increases, the flesh tone characteristic will extend from a point (black) on the luminance axis, away from the luminance axis into the space above a colour quadrant in the chromaticity plane, and back to the luminance axis for "white". Thus for any value of luminance there is a single value of CHR1 and a single value of CHR2; the single value of CHR1 for each of the mid-tone, highlight and shadow characteristics, is shown in FIG. 3 in which the luminance axis and one chromaticity axis are in the plane of the paper.

I claim:

1. A method of retouching a coloured image in the preparation of printing plates for the reproduction of a coloured original, including deriving electric signals representing colour values of selected successive picture elements of the original and using the said signals, after modification, to control the colours of corresponding picture elements in the reproduction, the method comprising:
   identifying signals corresponding to picture elements in a selected area of the original;
   deriving a luminance signal from the colour-representing electric signals corresponding to the selected area;
   applying the luminance signal as an input to each of a pair of one-dimensional function generators to generate chromaticity signals as predetermined or adjustable functions of the luminance signal;
   and preparing the said printing plates for reproducing the coloured original using, for picture elements within the selected area, signals derived from the generated chromaticity signals and the luminance signal in place of the said colour-representing signals originally derived for those picture elements, while using for the reproduction of picture elements in the remaining area signals whose colour values are based on the colour values of the original colour-representing electric signals.

2. A method in accordance with claim 1, comprising, prior to the making of the reproduction, displaying the image on a display unit, using the chromaticity signals derived from the said function generators and the luminance signal for the selected picture elements, and varying the functions provided by the said function generators until the displayed image is satisfactory.

3. A method in accordance with claim 1 in which the luminance signal is first applied to a one-dimensional digital function generator providing a luminance gradation function, and the output of the said function generator constitutes the luminance signal which is applied to the pair of one dimensional chromaticity function generators, the outputs of the chromaticity function generators and the gradation function generator being used in place of the colour-representing electric signals.

4. A method in accordance with claim 1 in which picture elements to be modified are identified by means of a mask.

5. A method in accordance with claim 1 in which picture elements to be modified are identified by an electronic mask.

6. In apparatus for retouching a coloured image prior to the preparation of printing plates for reproducing the coloured image including image-analysing means for deriving electric signals which represent colour values of successive picture elements of the original, means for modifying the values of the electric signals, and reproducing means utilising the signals to control the colour of corresponding picture elements in the reproduction, the provision of retouching means in the signal-modifying means, the retouching means comprising:
   means for identifying signals corresponding to picture elements in a selected area of the original;
   means for deriving a luminance signal from the colour-representing electric signals corresponding to picture elements in the selected area;
   a pair of one-dimensional function generators connected to receive as an input the said luminance signal and to provide at their outputs respective chromaticity signals as predetermined or adjustable functions of the luminance signal;
   and means for obtaining a retouched set of picture element signals for the whole of the image to be reproduced including, for picture elements within the said selected area, signals derived from the generated chromaticity signals and the luminance signal in place of the said colour-representing signals derived by the image-analysing means, and further including, for picture elements in the remaining area, signals whose colour values are based on the colour values of the colour-representing electric signals derived by the image-analysing means.

7. Apparatus in accordance with claim 6, in which the one-dimensional function generators are digital electronic look-up tables.

8. Apparatus in accordance with claim 6 further comprising a display unit responsive to signals representing picture elements to provide a display of the image, the display unit being responsive to signals derived from the luminance signal and the chromaticity signals from the function generators, and manually operated means for modifying the said generated chromaticity signals before they are used to control the colour of the picture elements in the reproduction.

9. Apparatus in accordance with claim 7, further comprising an additional electronic look-up table to which the luminance signal is first applied, the additional look-up table storing a gradation function and providing at its output the input signals for the one-dimensional digital chromaticity look-up tables.

10. A method of retouching a coloured image in the preparation of printing plates for the reproduction of a coloured original, including deriving electric signals representing colour values of selected successive picture elements of the original and using the said signals, after modification, to control the colours of corresponding picture elements in the reproduction, the method comprising:
    identifying signals corresponding to the picture elements of a selected colour in the original;
    deriving a luminance signal from the colour-representing electric signals corresponding to the selected colour;
    applying the luminance signal as an input to each of a pair of one-dimensional function generators to generate chromaticity signals as predetermined or adjustable functions of the luminance signal;
    and preparing the said printing plates for reproducing the coloured original using, for picture elements corresponding to picture elements of the selected colour in the original, signals derived from the generated chromaticity signals and the luminance signal in place of the said colour-representing signals originally derived for those picture elements, while using for the reproduction of other picture elements signals whose colour values are based on the colour values of the original colour-representing electric signals.

11. A method in accordance with claim 10, including further identifying signals corresponding to picture elements of a selected colour in the selected area of the original, and thereafter deriving a luminance signal and generating chromaticity signals only for such further identified signals.

12. A method in accordance with claim 10, comprising, prior to the making of the reproduction, displaying the image on a display unit, using the chromaticity signals derived from the said function generators and the luminance signal for the selected picture elements, and varying the functions provided by the said function generators until the displayed image is satisfactory.

13. A method in accordance with claim 10 in which the luminance signal is first applied to a one-dimensional digital function generator providing a luminance gradation function, and the output of the said function generator constitutes the luminance signal which is applied to the pair of one dimensional chromaticity function generators, the outputs of the chromaticity function generators and the gradation function generator being used in place of the colour-representing electric signals.

14. In apparatus for retouching a coloured image prior to the preparation of printing plates for reproducing the coloured image including image-analysing means for deriving electric signals which represent colour values of successive picture elements of the original, means for modifying the values of the electric signal, and reproducing means utilizing the modified signals to control the colour of corresponding picture elements in the reproduction, the provision of retouching means in the signal-modifying means, the retouching means comprising:
    means for identifying signals corresponding to picture elements of a selected colour in the original;
    means for deriving a luminance signal from the colour-representing electric signals corresponding to picture elements in the selected colour;
    a pair of one-dimensional function generators connected to receive as an input the said luminance signal and to provide at their outputs respective chromaticity signals as predetermined or adjustable functions of the luminance signal;
    and means for obtaining a retouched set of picture element signals for the whole of the image to be reproduced including, for picture elements having the said selected colour in the original, signals derived from the generated chromaticity signals and the luminance signal in place of the said colour-representing signals derived by the image-analysing means, and further including, for the reproduction of other picture elements, signals whose colour values are based on the colour values of the colour-representing electric signals derived by the image-analysing means.

15. Apparatus in accordance with claim 14 further comprising a display unit responsive to signal representing picture elements to provide a display of the image, the display unit being responsive to signals derived from the luminance signal and the chromaticity signals from the function generators, and manually operated means for modifying the said generated chromaticity signals before they are used to control the colour of the picture elements in the reproduction.

* * * * *